United States Patent Office 3,521,855
Patented July 28, 1970

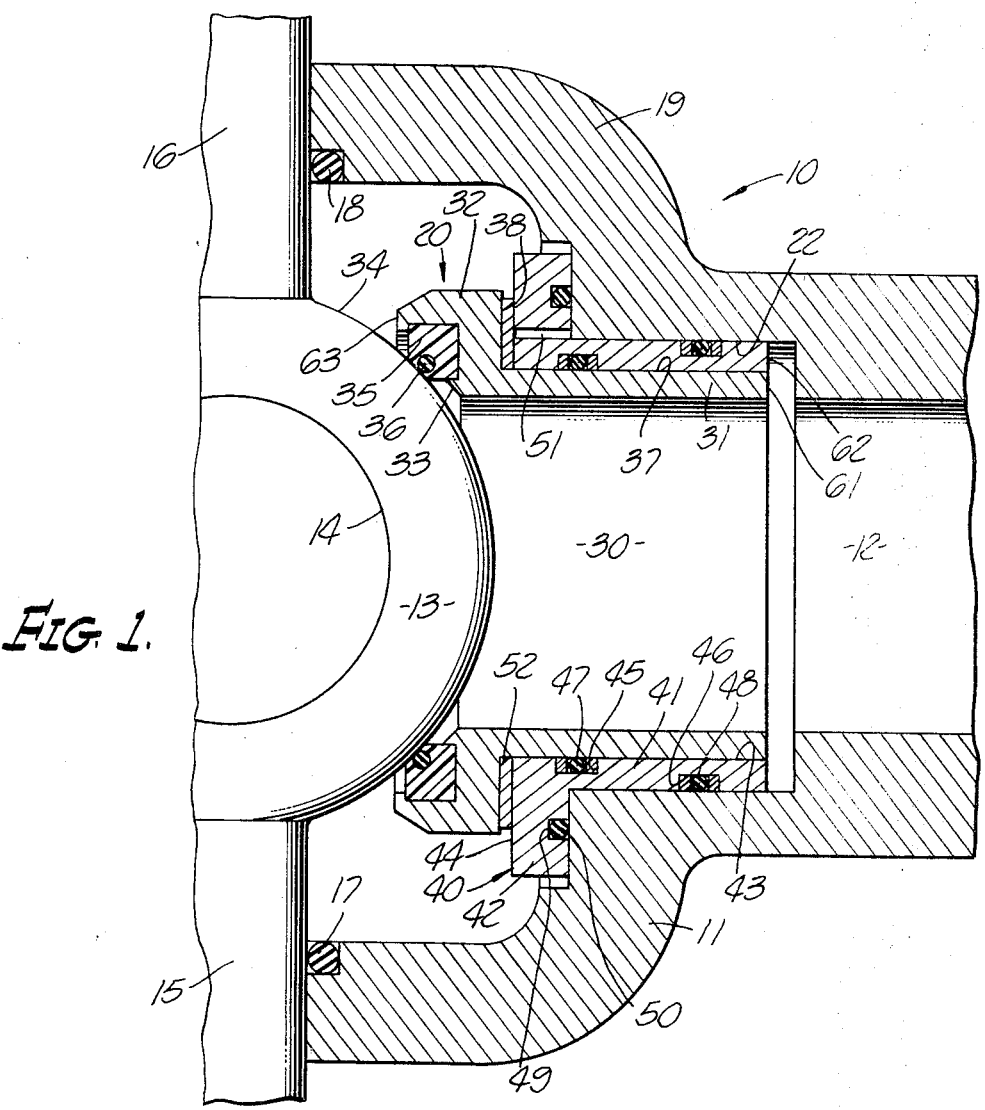

3,521,855
BALL VALVE SEAT-SEAL
William E. Jensen, Tujunga, Calif., assignor to Bell
Aerospace Corporation, a corporation of Delaware
Filed Aug. 31, 1967, Ser. No. 664,850
Int. Cl. F16k 25/00
U.S. Cl. 251—172                1 Claim

ABSTRACT OF THE DISCLOSURE

Disclosed is a ball valve having a seal which operates on the pressure differential concept wherein the differences of pressure on the upstream and downstream side of the seal surrounding the ball valve when the same is closed is effective to cause the seat to firmly engage the surface of the ball valve and effect a seal with respect thereto to prevent leakage of fluid past the seat. A single seat-seal structure is utilized to effect the desired seal irrespective of the direction of flow of fluid through the valve. The seat-seal is constructed of a pair of members which slidably engage each other and which define a pair of opposed surfaces within which a spacer can be positioned to adjust the longitudinal dimension of the seat-seal means thereby applying the desired contact pressure under a no-pressure load condition against the surface of the ball valve.

BACKGROUND OF THE INVENTION

Prior art ball valves have employed various sealing means which break down basically into two separate categories. One of these is the spherical seat formed by the cavity of the valve body and the other is inserted seats which encircle the opening in the valve. The present invention relates to the inserted seat type seal and in addition thereto to the type of such inserted seat which is axially movable in response to the application of pressure thereto, such for example, as the type illustrated in Pats. 2,919,886; 2,796,230; 3,044,741; 3,068,887 and the like.

Such prior art axially movable valve seats have a common inherent disadvantage of requiring the maintenance of extremely close tolerances during construction and particularly extremely close tolerances with respect to that portion of the housing or body which receives the seat insert. The maintenance of such close tolerances is required so as to obtain the required mechanical contact under no-pressure load conditions between the valve seat and the valve body thereby to preclude the passage of fluid between the valve seat and the valve body when fluid is applied to the structure.

Accordingly, it is an object of the present invention to provide a valve mechanism having an improved sealing means which includes a floating removable ball valve single seat-seal means which accomplishes bi-directional sealing.

It is another object of the present invention to provide a valve mechanism having pressure assisted ball valve seat-seal means to prevent internal fluid leakage between the valve seat and the valve body, which includes a novel axially movable and adjustable ball valve seal-seat means positioned adjacent the ports of the valve.

SUMMARY OF THE INVENTION

Ball valve seat means in accordance with the present invention includes a valve body defining an annular recess therein within which there is seated an annular seat-seal member which includes an annular seat holder carrying an annular valve seat disposed in sliding engagement with the ball valve and including first and second angularly disposed surfaces. An annular ring member having third and fourth angularly disposed surfaces is also included in the seat-seal member and positioned with respect to the seat holder in such a way that the first and third surfaces are in sliding engagement and the second and fourth surfaces are in an opposed relationship. Sealing means is positioned between the body and the seat-seal member so as to prevent fluid leakage between the body and the seat-seal member. Spacer means is disposed between the seat holder and the ring member so as to adjust the longitudinal dimension of the seat-seal member, thereby to provide a predetermined pressure-unloaded force of the valve seat against the valve body.

Additional objects and advantages of the present invention both as to its organization and method of operation will become apparent from a consideration of the following description taken in conjunction with the accompanying drawing which is presented by way of example only and is not intended as a limitation upon the scope of the present invention as defined in the claim appended hereto and in which:

FIG. 1 is a fragmentary schematic sectional illustration of one form of a seat-seal means constructed in accordance with the present invention; and FIG. 2 is a fragmentary view of one portion of a seat-seal structure constructed in accordance with a second embodiment of the present invention.

DESCRIPTION OF THE PREFERRED EMBODIMENT

Referring now to FIG. 1 of the drawing, there is schematically illustrated in a fragmentary view a valve 10 having a valve body 11 defining a fluid passageway 12 therethrough. Positioned within the body 11 is a ball valve 13 having an opening 14 provided therein, the opening 14 being alignable with the passageway 12 when the ball valve 13 is turned so as to have the opening 14 coaxial with the passageway 12. As illustrated in FIG. 1, the ball valve is positioned upon trunnions 15 and 16 in such a maner as to close the passageway 12 to the flow of fluid therethrough. The ball valve 13 is supported upon the trunnions 15 and 16 in any manner (not shown) known to those skilled in the art and may be actuated either manually or automatically, again by any mechanism known to those skilled in the art (not shown). An annular resilient O-ring type seal 17–18 is positioned about the trunnions 15–16, respectively, to effect a seal to preclude the flow of fluid externally of the body 11. The body 11 can be dismantled, as is well known in the prior art (although not expressly shown on the drawing) thereby permitting the seat-seal means 20 to be removed. In this manner, should there be any wear or damage with respect to the valve seat means, the valve seat means may be replaced without discarding or damaging the ball valve. It will be recognized by those skilled in the art that the remainder of the valve is a mirror image of the body 12 and ball 13, but will not usually include the seat means 20.

The body 11 defines a recess 22 within which the valve seat means 20 is disposed. The valve seat means includes an annular seat holder 30 and an annular ring member 40. The annular seat holder 30 includes a cylindrical body portion 31 and a radially outwardly extending flange 32. The flange 32 includes a face 33 opposing the surface 34 of the ball valve 13. Disposed within the face 33 of the seat holder is a valve seat 35 which is constructed of any hard bearing material having a low coefficient of friction with respect to the surface of the ball valve 13, such for example as the plastics nylon and Teflon. If desired, an elastomeric annular resilient O-ring 36 may be disposed within a recess provided in the face of the valve seat 35, thereby to effect a positive sealing between the valve seat 35 and the surface 34 of the ball valve 13.

The seat holder further defines first and second angularly disposed surfaces 37 and 38 respectively which are displaced from the valve seat 35. The first surface 37 is the outer diametral surface of the body 31 while the second surface 38 is the surface of the flange 32 opposite the ball valve 13. In the particular configuration illustrated, the surfaces 37 and 38 are contiguous and are orthogonally disposed with respect to each other.

The annular ring member 40 includes a cylindrical body portion 41 and an outwardly radially extending flange 42. The annular ring member 40 also defines third and fourth surfaces 43 and 44 respectively. The surface 43 is the inner diametral surface of the body portion 41 while the fourth surface 44 is the surface of the flange 42 facing the ball valve 13. It should be expressly noted that the first surface 37 and third surface 43 are in sliding engagement with respect to each other, while the second surface 38 and the fourth surface 44 are in opposed relationship. Again, the surfaces 43 and 44 are contiguous and orthogonally disposed.

The annular ring 40 defines a pair of recesses 45 and 46, each of which receives an annular resilient sealing member of the O-ring type as indicated at 47 and 48 respectively. Each of the O-rings 47 and 48 is provided with the usual backup disks as shown to maintain the O-rings in position irrespective of the pressure load applied thereto by the fluid. The O-ring 47 effects a seal between the surfaces 37 and 43 to preclude the passage of fluid between these surfaces. The O-ring 48 effects a fluid seal between the annular ring 40 and the recess 22 formed in the body 11 of the valve. The flange 44 of the annular ring 40 defines an additional recess 49 within which there is positioned an elastomeric annular resilient O-ring 50 which operates solely as a spring member and does not function as a seal. Such is further exemplified by the provision of a vent 51 through the flange 40 below the O-ring 50.

Spacer means such as a shim in the form of an annular washer 52 is positioned between the opposed surfaces 38 and 44. The insertion of the spacer 52, which may be one or a plurality of washers, of a desired thickness controls the axial dimension of the seat-seal member 20 and thereby determines the amount of pressure which will be applied by the valve seat 35 against the surface 34 of the ball valve body 13 under no-pressure load conditions. By the utilization of the adjustability function provided by the spacer means 52, no particular intricate machining operations need be made upon the surfaces provided by the recess 22 such as the shoulder 23 since such is not a sealing surface. Furthermore, no particular criticality need be assigned to the precise dimensioning of the distances from the recess which receives the seat-seal member and the surface of the ball valve since any usual variances in such tolerances are easily accommodated by the spacer 52.

In operation, with the ball closed as shown, assuming fluid is entering from the right and flowing toward the left, FIG. 1, fluid pressure acts against the surfaces 61 and 62 of the seat holder 30 and the annular ring 40 respectively to force the valve seat 35 against the surface 34 of the ball valve. Simultaneously fluid pressure also operates against the surface 33 to oppose the forces created by the pressure acting against the surfaces 61 and 62. By properly sizing the surfaces 61 and 62 with respect to the surface 33, a net force is generated toward the left as viewed in FIG. 1 to effect a positive seal of the seat 35 against the surface 34. The foregoing effect is well known in the prior art and will not be further described in detail herein.

Assuming further that the flow of fluid is toward the right as viewed in FIG. 1, a similar operation occurs in that the fluid under pressure creates a force acting upon the surface 38 which tends to force the seat 35 toward the left as viewed in FIG. 1, while at the same time the fluid operates against the surface 63 of the flange 32 to counterbalance a portion of the force thus created, thereby again effecting a net force toward the left to seal the seat 35 against the surface 34 but with a predetermined amount of frictional loading, thereby permitting easy operation of the ball valve even though a positive seal is readily and positively effected.

Referring now to FIG. 2, a seat-seal structure similar to that illustrated in FIG. 1 is shown, but with slight variations. Since the structures are quite similar, only the variations will be referred to. The seal 40 consisting of the O-ring 47 has been eliminated and a new seal has been provided which functions precisely the same as the seal 47. This seal as shown in FIG. 2, however, includes a recess 71 provided in the outer diametral surface of the seat holder and further includes an annular resilient O-ring type seal 72 with the backing members positioned adjacent thereto. The O-ring 72 effects a seal between the first and third surfaces as above described.

A further difference is the provision of the elastomeric annular resilient O-ring spring in the surface 38 of the seat holder by providing a recess 73 and an O-ring 74. It should be noted that the O-ring 74 abuts the spacer 52. The remainder of the structure is identical as well as is the operation to that described in conjunction with FIG. 1 above.

There has thus been described a ball valve seat means which is axially adjustable and which accomplishes a positive and efficient sealing without intricate machining or close tolerances of the ball valve body as heretofore required in the prior art. Although a specific structure of a ball valve incorporating the ball valve seat means in accordance with the present invention has been illustrated and described in the foregoing specification, such is not to be taken as a limitation upon the scope of the claim appended hereto.

What is claimed is:

1. In a ball valve construction including a valve body having a cylindrical fluid passage and a ball valve opening and closing said fluid passage, valve seat means operative solely by fluid pressure differential thereacross to effect a seal with said ball valve irrespective of the direction of highest fluid pressure in said passage, said valve seat comprising:

(1) an annular recess in said valve body defining a surface coaxial with said fluid passage and opposing said valve and a shoulder; and (2) only one annular seat-seal member received in said annular recess, said seat-seal member having an opening therethrough having an axis in alignment with said passage and including (a) an annular seat holder having a radial flange and carrying an annular valve seat disposed for sliding engagement with said ball valve, said seat holder having first and second orthogonally angularly disposed contiguous surfaces displaced from said valve seat, said first surface being parallel to said axis, (b) an annular ring member having a radial flange and being disposed in sliding engagement with said surface of said recess and having third and fourth orthogonally angularly disposed contiguous surfaces, said third surface being parallel to said axis, (c) said first and third surfaces being in sliding engagement, (d) said second and fourth surfaces being in opposed side by side relationship, said radial flange on said annular ring member being in engagement with said shoulder defined by said annular recess, (e) sealing means positioned between said surface of said recess and said annular ring member and said first and third surfaces to prevent substantial fluid leakage between said seat-seal member and said recess surface, and (f) spacer means disposed between said second and fourth surfaces to adjust the longitudinal dimension along said axis of said seat-seal member to cause said seat to engage said ball when there is no pressure differential across said seat means and thereby to provide a predetermined pressure-unloaded force of said valve seat against said valve.

References Cited

UNITED STATES PATENTS

| | | | |
|---|---|---|---|
| 2,796,230 | 6/1957 | Grove | 251—172 |
| 2,868,497 | 1/1959 | Graham | 251—172 |
| 2,916,254 | 12/1959 | Wendell | 251—172 |
| 3,047,265 | 7/1962 | Kaiser | 251—172 |
| 3,122,352 | 2/1964 | Anderson | 251—172 |
| 3,132,837 | 5/1964 | Britton | 251—172 |
| 3,214,135 | 10/1965 | Hartmann | 251—315 |
| 3,269,691 | 8/1966 | Meima | 251—174 X |
| 3,378,026 | 4/1968 | Oliver | 251—174 X |

CLARENCE R. GORDON, Primary Examiner

U.S. Cl. X.R.

251—315, 174